US011500447B2

(12) United States Patent
Hodes et al.

(10) Patent No.: US 11,500,447 B2
(45) Date of Patent: Nov. 15, 2022

(54) POWER ALLOCATION MANAGEMENT FOR EXTERNAL STORAGE

(71) Applicant: Western Digital Technologies, Inc., San Jose, CA (US)

(72) Inventors: Avichay Haim Hodes, Kfar Ben-Nun (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/825,836

(22) Filed: Mar. 20, 2020

(65) Prior Publication Data
US 2021/0294408 A1  Sep. 23, 2021

(51) Int. Cl.
*G06F 1/3228* (2019.01)
*G06F 1/3234* (2019.01)

(52) U.S. Cl.
CPC .......... *G06F 1/3275* (2013.01); *G06F 1/3228* (2013.01); *G06F 1/3253* (2013.01)

(58) Field of Classification Search
CPC .. G06F 1/3275; G06F 1/32–08; G06F 1/3225; G06F 1/3293; G06F 1/3287
USPC ...................................................... 713/3–323
See application file for complete search history.

(56) References Cited

U.S. PATENT DOCUMENTS

| | | | | |
|---|---|---|---|---|
| 5,615,162 A | * | 3/1997 | Houston | .................. G11C 5/14 365/226 |
| 10,146,292 B2 | | 12/2018 | Bahirat | |
| 2009/0063874 A1 | * | 3/2009 | Diab | ....................... G06F 1/266 713/300 |
| 2010/0287391 A1 | * | 11/2010 | Ochiai | ................ G06F 13/1668 713/320 |
| 2014/0089696 A1 | * | 3/2014 | Chen | ..................... G06F 1/3212 713/320 |
| 2015/0331476 A1 | * | 11/2015 | Slik | ........................ G06F 1/3275 713/324 |
| 2016/0372160 A1 | * | 12/2016 | Lehmann | ................. G06F 1/329 |
| 2017/0024002 A1 | * | 1/2017 | Tzafrir | .................. G06F 1/3275 |

(Continued)

FOREIGN PATENT DOCUMENTS

WO      2017188981 A1    11/2017

OTHER PUBLICATIONS

NVM Express, "Base Specification" Revision 1.4; http://nvmexpress.org, Jun. 10, 2019 (403 pages).

*Primary Examiner* — Paul Yen
(74) *Attorney, Agent, or Firm* — Patterson & Sheridan, LLP; Steven H. VerSteeg (57) ABSTRACT

The present disclosure generally relates to power management for an external storage device. The external storage device includes a power allocation unit coupled to an array of memory devices. A single bridge is present to provide a connection to a host device. The memory devices have operational power states that utilize a first amount of power and non-operational power states that utilize a second amount of power that is less than the first amount of power. The power allocation unit changes the power state of the individual memory devices between operational and non-operational based upon need, but also ensures that the external storage device does not exceed the total power allocation. Thus, the power allocation unit may change a power state of one memory device from operational to non-operational in order to change the power state of another memory device from non-operational to operational.

20 Claims, 4 Drawing Sheets

(56) References Cited

U.S. PATENT DOCUMENTS

2018/0107417 A1    4/2018   Shechter et al.
2019/0042444 A1    2/2019   Natarajan et al.
2019/0086995 A1    3/2019   Koyama et al.

* cited by examiner

POWER ALLOCATION MANAGEMENT FOR EXTERNAL STORAGE

BACKGROUND OF THE DISCLOSURE

Field of the Disclosure

Embodiments of the present disclosure generally relate to a power management for an external storage device.

Description of the Related Art

As flash memory prices decline, solid state devices (SSDs) are penetrating the external storage market. In many cases, external storage devices include a standard internal SSD with an adapter that translates the protocol and power requirements of a USB-attached device to those of an internal NVMe SSD. Since USB devices tend to be used as backup or portable storage, USB devices are also marketed in different capacity points than internal devices, and higher-capacitor USB devices may include multiple internal NVMe storage devices combined into a "just a bunch of disks" (JBOD)-type array.

The power constraints of an external USB device are generally stricter than those of an internal NVMe SSD. Additionally, the power constraints of external USB devices are also generally stricter than those of a combination of multiple NVMe SSDs.

Very large USB devices use a single off-the-shelf NVMe drive. In very large capacity points, the NVMe drive used may be an enterprise-grade device, since enterprise-grade devices are more common in those capacity points.

What is needed is a way of utilizing NVMe power states already provisioned within internal SSDs in order to budget power such that multiple devices can co-exist and be accessible in parallel while attached to a removable power source.

SUMMARY OF THE DISCLOSURE

The present disclosure generally relates to power management for an external storage device. The external storage device includes a power allocation unit coupled to an array of memory devices. A single bridge is present to provide a connection to a host device. The memory devices have operational power states that utilize a first amount of power and non-operational power states that utilize a second amount of power that is less than the first amount of power. The power allocation unit changes the power state of the individual memory devices between operational and non-operational based upon need, but also ensures that the external storage device does not exceed the total power allocation. Thus, the power allocation unit may change a power state of one memory device from operational to non-operational in order to change the power state of another memory device from non-operational to operational.

In one embodiment, a data storage device comprises: a plurality of memory devices; and a power allocation unit coupled to each memory device of the plurality of memory devices, wherein the power allocation unit is configured to: place the plurality of memory devices into a non-operational power state; determine whether a relevant memory device of the plurality of memory devices is in a proper operational power state; and change the power state of the relevant memory device to a different power state.

In another embodiment, a data storage device comprises: a plurality of memory devices; and a power allocation unit coupled to each memory device of the plurality of memory devices, wherein the power allocation unit is configured to: determine whether a desired memory device is in a proper power state; determine whether the data storage device has sufficient power available to change a power state of the desired memory device from a non-operational power state to an operational power state; determine whether any memory devices of the plurality of memory devices is idle and in the operational power state; and move the desired memory device from the non-operational power state to the power operational state.

In another embodiment, a data storage device comprises: a plurality of memory devices; means to allocate power amongst the plurality of memory devices; means to move a first memory device of the plurality of memory devices from a non-operational power state to an operational power state; and means to move a second memory device from the operational power state to the non-operational power state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to power management for an external storage device. The external storage device includes a power allocation unit coupled to an array of memory devices. A single bridge is present to provide a connection to a host device. The memory devices have operational power states that utilize a first amount of power and non-operational power states that utilize a second amount of power that is less than the first amount of power. The power allocation unit changes the power state of the individual memory devices between operational and non-operational based upon need, but also ensures that the external storage device does not exceed the total power allocation. Thus, the power allocation unit may change a power state of one memory device from operational to non-operational in order to change the power state of another memory device from non-operational to operational.

Figure 1:
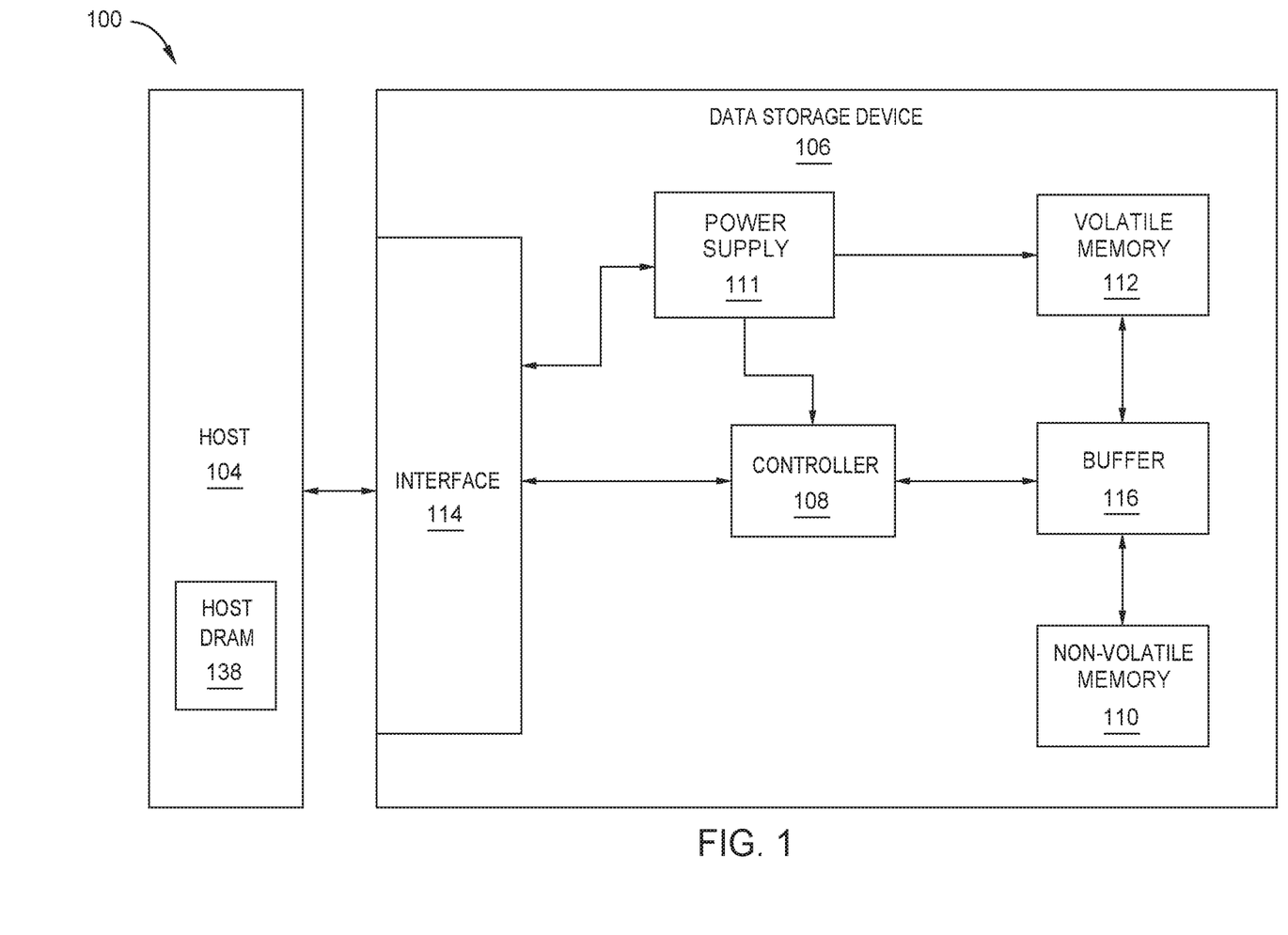
FIG. 1 is a schematic illustration of a computing system including a host device and a data storage device.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a buffer 116. The controller 108 comprises an internal memory or buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
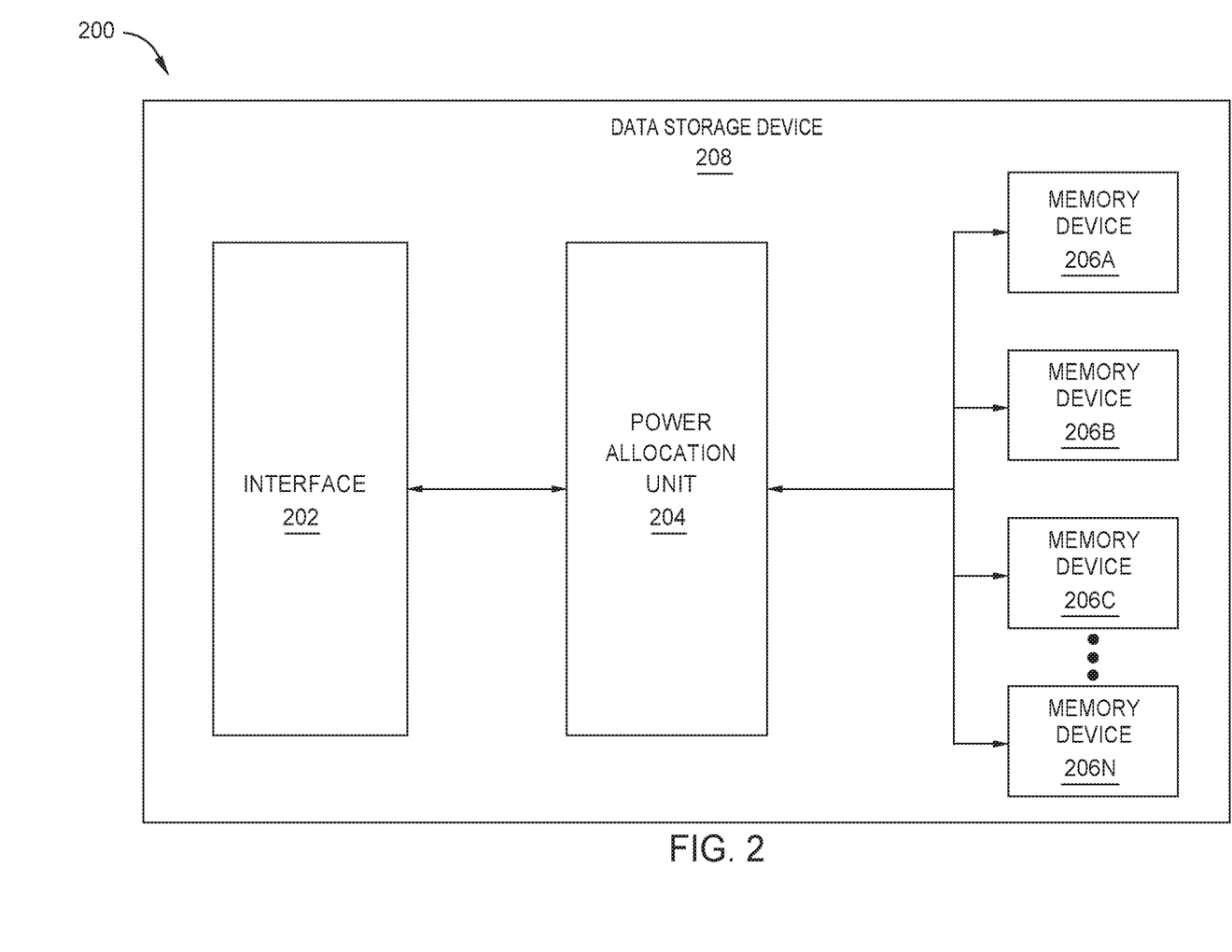
FIG. 2 is a schematic illustration of a data storage device according to one embodiment.

FIG. 2 is a schematic illustration of a data storage device 208 according to one embodiment. Data storage device 208 comprises an interface 202 and a power allocation unit (PAU) 204. The interface 202 may be the interface 114 of FIG. 1. The data storage device 208 further comprises an array of memory devices 206A-206N (collectively referred to as memory devices 206). The notation "N" refers to the last memory device of a plurality of memory devices. Furthermore, the memory devices 206 may be the non-volatile memory 110 of FIG. 1 or an NVMe storage device. Each of the memory devices 206A-206N may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). However, the listed data storage size of the memory devices is not intended to be limiting nor restricting. Furthermore, in one embodiment, memory devices 206A-206N are the same type and have the same data storage sizes. In another embodiment, memory devices 206A-206N are different types, but have the same data storage sizes. In yet another embodiment, memory devices 206A-206N are different types and have different data storage sizes.

The power allocation unit 204 may be coupled with a controller (not shown), such as the controller 108 of FIG. 1. The PAU 204 appropriates power received from the host device, such as the host device 104 of FIG. 1, to each of the memory devices 206. The controller 108 may determine the appropriate power state of each memory device 206A-206N and the PAU 204 provides the corresponding power to each memory device 206A-206N.

The host device 104 may provide a suitable amount of power to the data storage device 208 through one or more pins on the interface 202. The suitable amount of power may be more than or equal to the amount of power the data storage device 208 requires to operate. For example, the power a data storage device 208 may receive from the host device 104 may be about 5 W. Furthermore, a data storage device 208 may draw out about 500 mW to about 15 W of power from the host device 104. The previously mentioned values for power are not intended to be limiting, but to provide a reference.

A memory device 206A-206N may have several power states (PS). For example, a memory device 206A-206N may have the following 5 power states: PS0, PS1, PS2, PS3, and PS4. Each of the power states are associated with a distinct data storage device 208 operation. Power states PS0, PS1, and PS2 are considered operational power states, utilizing about 1 W to about 8 W of power, whereas power states PS3 and PS4 are considered non-operational power states, utilizing about 2 mW to about 50 mW of power. An operational power state refers to the ability of a host device, such as the host device 104 of FIG. 1, to communicate with a memory device 206A-206N of a data storage device 208.

Power states are numbered sequentially, where higher numbers represent lower power requirements and corresponding higher exit latencies. Furthermore, each power state has an associated power requirement and an exit latency. PS0 may require 4.5 W with the lowest exit latency. PS1 may require less power than PS0, such as 3 W, and may have an exit latency equal to or higher than the exit latency of PS0. PS2 may require less power than PS1 and may have an exit latency equal to or higher than the exit latency of PS1. PS3 may require less power than PS2 and may have an exit latency equal to or higher than the exit latency of PS2. PS4 may require less power than PS3, such as 5 mW, and may have an exit latency equal to or higher than the exit latency of PS3, such as 50 mW. The values for the power states and exit latencies are not intended to be limiting, but to provide an example of possible embodiments.

PS0 is referred to as a full operational state, where I/O commands are enabled and the device may generate interrupts. Interrupts are an automatic transfer of firmware execution due to a system timer or a user command. Furthermore, power states PS1, PS2, PS3, and PS4 are considered low power states. Power states PS1 and PS2 are also operational states, however, PS1 and PS2 may have a lower functionality than that of PS0. Power states PS3 and PS4 are non-operational states have a power requirement less than that of the operational power states. Furthermore, memory devices 206 not used are placed in a non-operational power state PS4 to limit the idle power consumption to a minimal value.

In order for I/O commands to occur, the memory device 206A-206N is woken up and placed into power state PS0. The controller, such as the controller 108 of FIG. 1, utilizes the PAU 204 to change the power state of a memory device 206A-206N from PS0 to either PS1, PS2, or PS3 dependent on the situation. However, in order for a memory device 206A-206N to be placed into PS4, the memory device 206A-206N will need to be in power state PS3. However, the controller 108 is able to utilize the PAU 204 to allocate the appropriate amount of power to place all power states PS1, PS2, PS3, and PS4 into power state PS0 when a full operational state is required.

Because a power limit may exist for different memory devices, such as a USB device, the PAU 204 may adjust the amount of power allocated to each memory device 206A-206N. For example, a common maximum power limit for a data storage device 208 is 4.5 W. If each memory device 206A-206N in a storage device 208. Since PS0 may utilize 4.5 W for optimal operation, only one memory device 206A may be in full operational state. The remaining memory devices 206B-206N are in a non-operational or an idle power state PS4 so that the power consumption of the memory devices 206B-206N is minimized. However, higher maximum power limits may exist for a data storage device 208 such as about 15 W to about 100 W. The maximum power limits listed are not intended to be limiting, but to provide examples of possible embodiments.

For a data storage device 208 with a maximum power limit of 15 W comprised of 20 memory devices 206A-206N, where N equals 20 in this example, the PAU 204 may allocate 4.5 W of power to multiple memory devices 206, such as 3 memory devices 206A-206C, so that the power usage total is 1.5 W. The remaining 17 memory devices 206C-206N are in a non-operational power state PS4 to have low idle power consumption.

However, the controller, such as the controller 108 of FIG. 1, may utilize the power allocation unit 204 to only provide one memory device 206, such as memory device 206A, with 4.5 W of power when utilized in order to maximize efficiency of the data storage device 208, instead of throttling the performance by providing power to all memory devices 206A-206N. Furthermore, the controller 108 may utilize a credit system to allocate memory device activity or intelligently wake up memory devices based on the historical access patterns of the memory devices 206 in order to reduce exit latency. The location of the data written to a memory device may be recorded by the controller in a flash translation layer table, so that the device knows where the data is stored.

Thus, the controller 108 of FIG. 1 utilizes the PAU 204 to effectively manage the power allocation to all the memory devices 206. Since the max power usage is from power state PS0, which is 4.5 W, the maximum number of memory devices 206A-206N that may be in power state PS0 at the same time can be solved as follows: Number of memory devices=rounddown(Device maximum power limit)/(power state PS0 power draw). The remaining devices are placed into a non-operational power state PS4 to have low idle power consumption. However, additional power states such as PS2, PS2, and PS3 may be used in order to optimize power draw and responsiveness in various scenarios.

Figure 3:
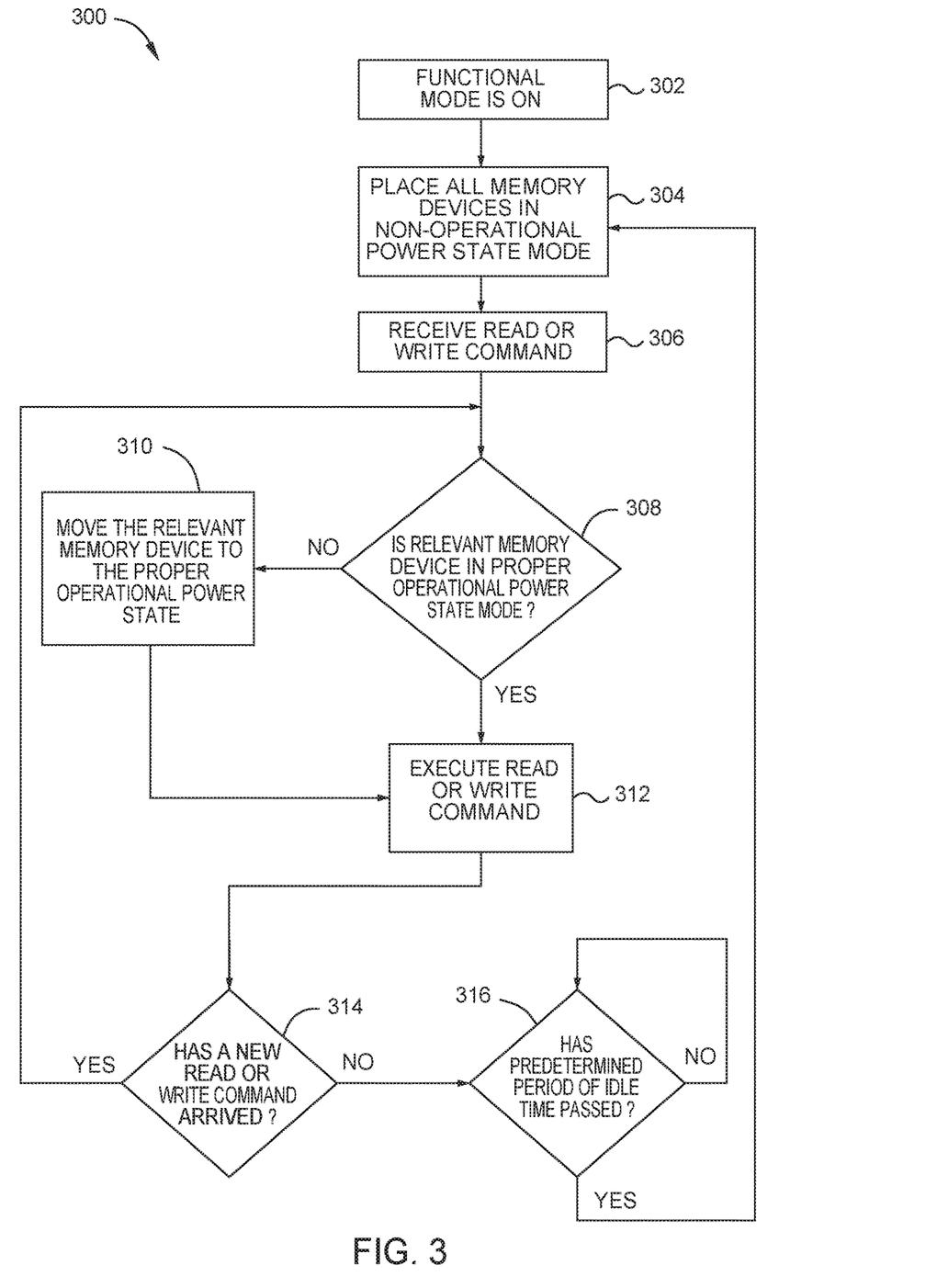
FIG. 3 is a flowchart illustrating a method of allocating power for memory devices of a data storage device according to one embodiment.

FIG. 3 is a flowchart illustrating a method 300 of allocating power for memory devices of a data storage device according to one embodiment. The method 300 utilizes a controller, such as the controller 108 of FIG. 1, a power allocation unit, such as the PAU 204 of FIG. 2, a plurality of memory devices, such as the memory devices 206 of FIG. 2, located within a data storage device, such as the data storage device 106 of FIG. 1 and/or the data storage device 208 of FIG. 2. Furthermore, the controller may utilize the PAU to provide the appropriate amount of power for a power state, PS0-PS4, to each of the memory devices. An operational power state is generally power state PS0, where the high power requirement results in a low exit latency which increases the efficiency of a read or write command. However, power states PS1 and PS2 are operational power states with lower power requirements than power state PS0, but higher exit latencies. The operational power states PS1 and PS2 may be utilized in order to optimize power draw versus responsiveness of the memory devices in various scenarios.

Furthermore, a non-operational power state is generally power state PS4, where power state PS4 has the lowest idle power consumption and a high exit latency. However, the non-operational power state PS3 may also be utilized in order to optimize power draw versus responsiveness of the memory devices in various scenarios. The power state PS3 has a higher idle consumption than that of power state PS4, but has a lower exit latency than that of power state PS4.

At block 302 of method 300, a controller, such as the controller 108 of FIG. 1, of the storage device has the functional mode toggled "on" so that the PAU, such as the PAU 204 of FIG. 2, distributes the appropriate amount of power based on the power state of the memory devices. At block 304, all memory devices are placed in a non-operational power state mode, such as power state PS4, so that data storage device has a minimized power consumption.

When the controller receives a read or write command at block 306, the controller will utilize the PAU to determine if the relevant memory device is in the proper operational power state mode at block 308. The relevant memory device is determined by the controller utilizing a credit system that allocates memory device activity or intelligently wake up memory devices based on the historical access patterns of the memory devices in order to reduce exit latency. The location of the data written to a memory device may be recorded by the controller in a flash translation layer table, so that the device knows where the data is stored.

If the controller determines that the memory device corresponding to the read or write command is not in the proper operational power state mode at block 308, then the controller will utilize the PAU to move the relevant memory device to the proper operational power state, such as power state PS0 or PS1, by allocating 4.5 W or the appropriate power to the associated memory device at block 310. The remaining power devices are still in a non-operational power state PS4.

After moving the relevant memory device to the proper operational power state at block 310, the controller will execute the read or write command at block 312. However, if the relevant memory device is in the proper operational power state mode, such as PS0 or PS1, then the controller will execute the read or write command at block 312 instead of instructing the PAU to allocate the appropriate amount of power to place the memory device in an operation state PS4 at block 310.

After the read or write command is executed at block 312, a determination is made at block 314 to determine if a new read or write command has arrived. If a new read or write command has arrived, then the process proceeds to block 308. If no new read or write command has arrived at block 314, then the memory device may become idle and the controller will determine if a predetermined period of idle time has passed at block 316. The predetermined period of idle time at block 316 may be dependent on the system parameter of the memory device or the data storage device. The idle time limit threshold is a period of time that the memory device does not have any activity (i.e., reads or writes to the relevant memory device). If the predetermined period of idle time at block 316 has not passed, then the memory device will remain in the operational power state, PS0 or PS1. However, if the predetermined period of idle time at block 316 has passed, then the memory device that is in an operation power state, PS0 or PS1, is placed into a non-operational power state mode, PS4 or PS3, at block 304. The controller then waits until a new read or write command is received and begins the process again at block 306.

Figure 4:
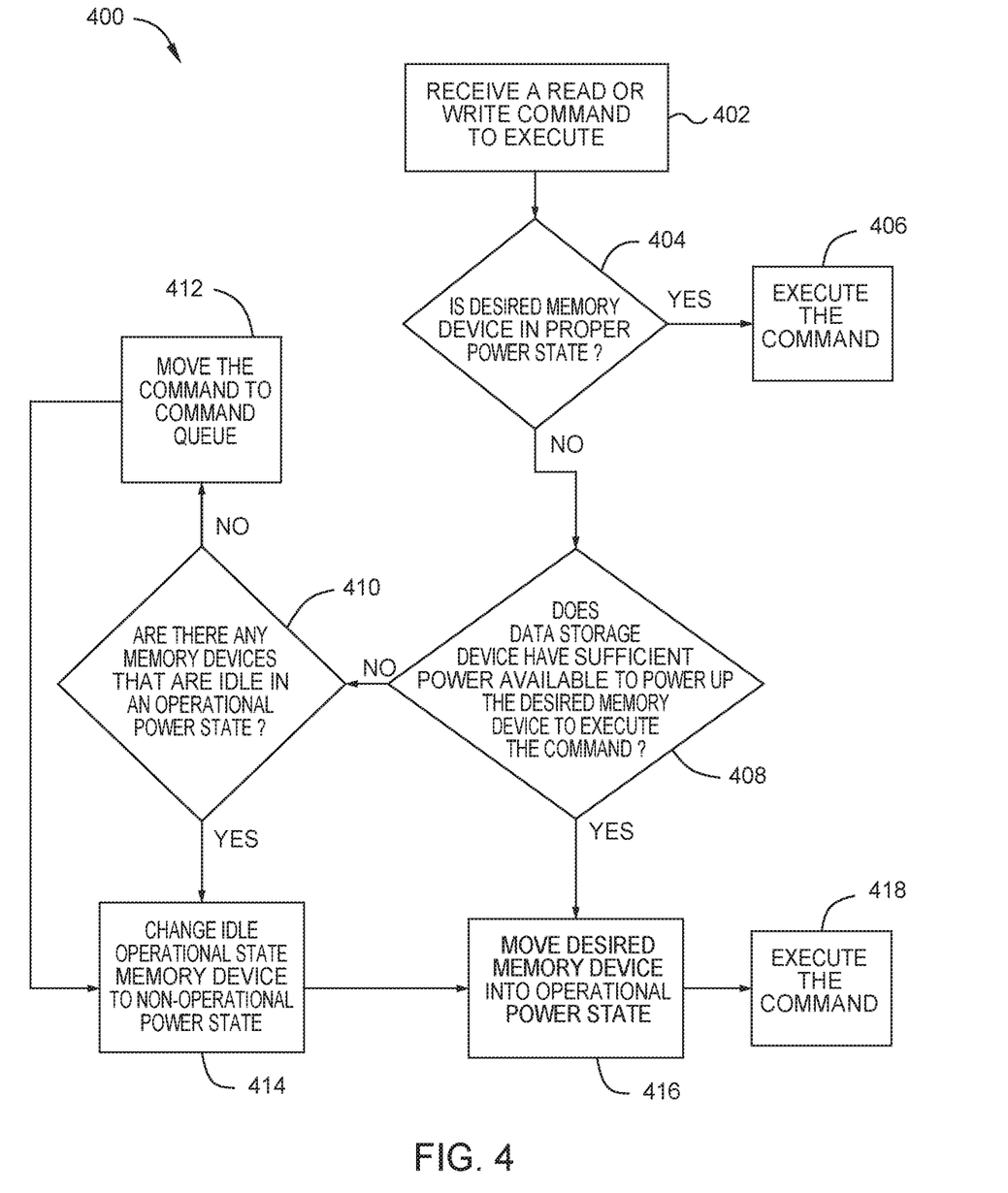
FIG. 4 is a flowchart illustrating a method of allocating power for memory devices of a data storage device according to another embodiment.

FIG. 4 is a flowchart illustrating a method 400 of allocating power for memory devices of a data storage device according to another embodiment. FIG. 4 may be a further representation of the method 300 of FIG. 3. The method 400 utilizes a controller, such as the controller 108 of FIG. 1, a power allocation unit, such as the PAU 204 of FIG. 2, a plurality of memory devices, such as the memory devices 206 of FIG. 2, located within a data storage device, such as the data storage device 106 of FIG. 1 and/or the data storage device 208 of FIG. 2. Furthermore, the controller may utilize the PAU to provide the appropriate amount of power for a power state, PS0-PS4, to each of the memory devices. An operational power state is generally power state PS0, where the high power requirement results in a low exit latency which increases the efficiency of a read or write command. However, power states PS1 and PS2 are operational power states with lower power requirements than power state PS0, but higher exit latencies. The operational power states PS1 and PS2 may be utilized in order to optimize power draw versus responsiveness of the memory devices in various scenarios.

Furthermore, a non-operational power state is generally power state PS4, where power state PS4 has the lowest idle power consumption and a high exit latency. However, the non-operational power state PS3 may also be utilized in order to optimize power draw versus responsiveness of the memory devices in various scenarios. The power state PS3 has a higher idle consumption than that of power state PS4, but has a lower exit latency than that of power state PS4.

At block 402, the controller of the data storage device receives a read or write command from a host, such as the host device 104 of FIG. 1. After receiving a read or write command, the controller determines if the desired memory device is in the proper power state by utilizing the PAU at block 404. If the relevant memory device is in the proper power state at block 404, then the command to read or write data from/to the data storage device is executed at block 406.

However, if the desired memory device is not in the proper power state at block 404, then the controller utilizes the PAU to determine if the data storage device has sufficient power available to power up the desired memory device to an operational power state, PS0 or PS1, to execute the command at block 408. If the data storage device does not have adequate power to power the desired memory device to an operational power state due to power limitations, then the controller will determine if there are any memory device that are in an idle operational state (i.e., the predetermined time after a memory device in a power state PS0 or PS1 has not expired) at block 410.

If there are no memory devices in the operational state that can be moved to the idle state, then the controller will move the command to the command queue at block 412. If there is at least one memory device in the operational state that can be moved to the idle state, the PAU changes the memory device to a non-operational power state, such as PS4, at block 414. The desired memory device is then changed into an operational power state, such as PS0, by the PAU at block 416, and the command is executed in block 418.

The controller utilizes the PAU to allocate power to each of the memory devices. The allocation of power allows one or more relevant memory devices to be in an optimal operational power state, PS0, while keeping the remaining memory devices at a non-operational low idle power consumption power state, PS4. The number of memory devices that can exist in an operational state, PS0 or PS1, is dependent on the maximum power limit of the data storage device. Furthermore, PS2 and PS3 may be utilized in order to optimize power draw versus responsiveness of the memory devices in various scenarios. When a memory device is needed, the PAU moves an idle operational memory device from an operational power state to a non-operational power state and moves a non-operational memory device from a non-operational power state to an operational power state.

In one embodiment, a data storage device comprises: a plurality of memory devices; and a power allocation unit coupled to each memory device of the plurality of memory devices, wherein the power allocation unit is configured to: place the plurality of memory devices into a non-operational power state; determine whether a relevant memory device of the plurality of memory devices is in a proper operational power state; and change the power state of the relevant memory device to a different power state. The data storage device further comprises a controller, wherein the controller is configured to receive read or write commands and execute the read or write commands. The power allocation unit is further configured to determine whether a memory device of the plurality of memory devices is idle in the operational power state. The power allocation unit is further configured to determine whether a memory device of the plurality of memory devices has exceeded an idle time limit threshold. The power allocation unit is further configured to change the power state of a memory device of the plurality of memory devices that has exceeded the idle time limit threshold from the operational power state to the non-operational power state. The changing the power state of the relevant memory device to a different power state is in response to determining that the relevant memory device is in the non-operational power state. The power allocation unit is configured to place the plurality of memory devices into a non-operational power mode in response to a predetermined period of idle time having passed for the plurality of memory devices.

In another embodiment, a data storage device comprises: a plurality of memory devices; and a power allocation unit coupled to each memory device of the plurality of memory devices, wherein the power allocation unit is configured to: determine whether a desired memory device is in a proper power state; determine whether the data storage device has sufficient power available to change a power state of the desired memory device from a non-operational power state to an operational power state; determine whether any memory devices of the plurality of memory devices is idle and in the operational power state; and move the desired memory device from the non-operational power state to the power operational state. The data storage device further comprising a controller configured to: receive read or write commands; and execute the read or write commands in response to the power allocation unit determining that the desired memory device is in the proper power state. The data storage device further comprising a controller configured to: receive read or write commands; and move the read or write commands to a command queue in response to the power allocation unit determining that there are no memory devices of the plurality of memory devices that is idle and in the operational power state. The data storage device further comprising a controller configured to: receive read or write commands; and execute the read or write commands after the power allocation unit has moved the desired memory device from the non-operational state to the operational power state. The moving the desired memory device from the non-operational power state to the power operational state occurs after the power allocation unit determines that the data storage device has sufficient power available to power up the desired memory device. The power allocation unit is configured to change a memory device that is idle and in the operational state to the non-operational power state. The power allocation unit is configured to moving the desired memory device from the non-operational power state to the power operational state occurs after the power allocation unit changes the memory device that is idle and in the operational state to the non-operational state.

In another embodiment, a data storage device comprises: a plurality of memory devices; means to allocate power amongst the plurality of memory devices; means to move a first memory device of the plurality of memory devices from a non-operational power state to an operational power state; and means to move a second memory device from the operational power state to the non-operational power state. The data storage device further comprises: means to receive read or write commands; and means to execute the read or write commands upon determining that a memory device is in a proper power state. The data storage device further comprises means to move read or write commands to a command queue upon determining that the data storage device does not have sufficient power available to power up a desired memory device and determining that there are no memory devices that are idle and in the operational power state. The data storage device further comprises means to determine whether a memory device of the plurality of memory devices is in a proper power state. The data storage device further comprises means to determine whether a memory device of the plurality of memory devices is idle and in the operational state. The data storage device further comprises means to determine whether the memory device of the plurality of memory devices that is idle and in the operational state has exceeded a predetermined idle threshold.

By utilizing a power allocation unit within a data storage device, power states already provisioned within an internal SSD can be utilized to budget power in an external device such that multiple memory devices can co-exist and be accessible in parallel while attached to a removable power source.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a plurality of memory devices;
   a controller configured to:
      determine a relevant memory device by utilizing a credit system configured to wake up memory devices based on historical access patterns of the memory devices;
      execute a read or write command at a block of the relevant memory device; and
      determine whether the read or write command has arrived at the block; and
   a power allocation unit coupled to each memory device of the plurality of memory devices, wherein the power allocation unit is configured to:
      place the plurality of memory devices into a non-operational power state;
      determine whether the relevant memory device of the plurality of memory devices is in a proper operational power state;
      determine that the data storage device has insufficient power available to power up the relevant memory device;
      change a power state of another memory device of the plurality of memory devices to a power state utilizing less power in response to determining that the data storage device has insufficient power available to power up the relevant memory device;
      change the power state of the relevant memory device to a different power state that utilizes more power;
      determine a predetermined period of idle time to pass while the relevant memory device is in the power state that utilizes more power after the controller has determined that the read or write command has arrived, wherein determining the predetermined period of idle time is determined by a system parameter of a memory device of the plurality of memory devices; and
      change the power state of the relevant memory device from the power state that utilizes more power to a non-operational power state after the predetermined period of idle time has passed.

2. The data storage device of claim 1, wherein the power allocation unit is further configured to determine whether a memory device of the plurality of memory devices is idle in the operational power state.

3. The data storage device of claim 2, wherein the power allocation unit is further configured to determine whether a memory device of the plurality of memory devices has exceeded an idle time limit threshold.

4. The data storage device of claim 1, wherein the power allocation unit is further configured to change the power state of the relevant memory device to a different power state in response to determining that the relevant memory device is in the non-operational power state.

5. The data storage device of claim 1, wherein the power allocation unit is further configured to place the plurality of memory devices into a non-operational power mode in response to a predetermined period of idle time having passed for the plurality of memory devices.

6. The data storage device of claim 1, wherein the power allocation unit is further configured to change the power state of the relevant memory device to a different power state that utilizes an amount of power equal to the amount of power the data storage device requires to operate.

7. The data storage device of claim 1, wherein the power allocation unit is further configured to change the power state of the relevant memory device to a different power state that utilizes an amount of power greater than the amount of power the data storage device requires to operate.

8. The data storage device of claim 1, wherein the controller is further configured to record the location of data written to a memory device in a flash translation layer table.

9. The data storage device of claim 1, wherein the power allocation unit is further configured to change the power state of the relevant memory device from a first non-operational power state to a second non-operational power state, wherein the second non-operational power state utilizes less power than the first non-operational power state.

10. A data storage device, comprising:
a plurality of memory devices;
a controller configured to:
determine a desired memory device by utilizing a credit system configured to wake up memory devices based on historical access patterns of the memory devices;
execute a read or write command at a block of the desired memory device; and
determine whether the read or write command has arrived at the block; and
a power allocation unit coupled to each memory device of the plurality of memory devices, wherein the power allocation unit is configured to:
determine whether a desired memory device is in a proper power state;
determine whether the data storage device has sufficient power available to change a power state of the desired memory device from a non-operational power state to an operational power state;
determine whether any memory devices of the plurality of memory devices is idle and in the operational power state;
determine that the data storage device has insufficient power available to power up the desired memory device;
change a power state of another memory device of the plurality of memory devices to a power state utilizing less power in response to determining that the data storage device has insufficient power available to power up the desired memory device;
move the desired memory device from the non-operational power state to an operational power state;
determine a predetermined period of idle time to pass while the desired memory device is in the operational power state after the controller has determined that the read or write command has arrived, wherein determining the predetermined period of idle time is determined by a system parameter of a memory device of the plurality of memory devices; and
change the power state of the desired memory device from the operational power state to the non-operational power state after the predetermined period of idle time has passed.

11. The data storage device of claim 10, wherein the controller is further configured to:
receive read or write commands; and
move the read or write commands to a command queue in response to the power allocation unit determining that there are no memory devices of the plurality of memory devices that are idle in the operational power state.

12. The data storage device of claim 10, wherein the controller is further configured to:
receive read or write commands; and
execute the read or write commands after the power allocation unit has moved the desired memory device from the non-operational state to the operational power state.

13. The data storage device of claim 10, wherein the moving the desired memory device from the non-operational power state to the operational power state occurs after the power allocation unit determines that the data storage device has sufficient power available to power up the desired memory device.

14. The data storage device of claim 10, wherein the power allocation unit is further configured to change a memory device that is idle and in the operational state to the non-operational power state.

15. The data storage device of claim 14, wherein the power allocation unit is further configured to move the desired memory device from the non-operational power state to the power operational state after changing the memory device that is idle and in the operational state to the non-operational state.

16. A data storage device, comprising:
a plurality of memory devices;
means to allocate power amongst the plurality of memory devices;
means to move a first memory device of the plurality of memory devices from a non-operational power state to an operational power state;
means to move a second memory device from the operational power state to the non-operational power state;
means to determine that the data storage device has insufficient power available to power up a relevant memory device;
means to change a power state of another memory device of the plurality of memory devices to a power state utilizing less power in response to determining that the data storage device has insufficient power available to power up the relevant memory device;
means to determine the relevant memory device by utilizing a credit system configured to wake up memory devices based on historical access patterns of the memory devices;
means to execute a read or write command at a block of the relevant memory device;
means to determine whether the read or write command has arrived at the block;
means to determine a predetermined period of idle time to pass while the relevant memory device is in the operational power state after the read or write command has arrived, wherein the predetermined period of idle time is based on a system parameter of a memory device of the plurality of memory devices; and
means to change the power state of the relevant memory device from the operational power state to the non-operational power state after the predetermined period of idle time has passed.

17. The data storage device of claim 16, further comprising means to move read or write commands to a command queue upon determining that the data storage device does not have sufficient power available to power up a relevant memory device and determining that there are no memory devices that are idle and in the operational power state.

18. The data storage device of claim 16, further comprising means to determine whether a memory device of the plurality of memory devices is in a proper power state.

19. The data storage device of claim 16, further comprising means to determine whether a memory device of the plurality of memory devices is idle and in the operational state.

20. The data storage device of claim 19, further comprising means to determine whether the memory device of the plurality of memory devices that is idle and in the operational state has exceeded a predetermined idle threshold.

* * * * *